Sept. 10, 1963  R. B. SMITH ETAL  3,103,541
RECOVERY OF DURENE USING HEATED SLURRY RECYCLE
Filed Nov. 12, 1959
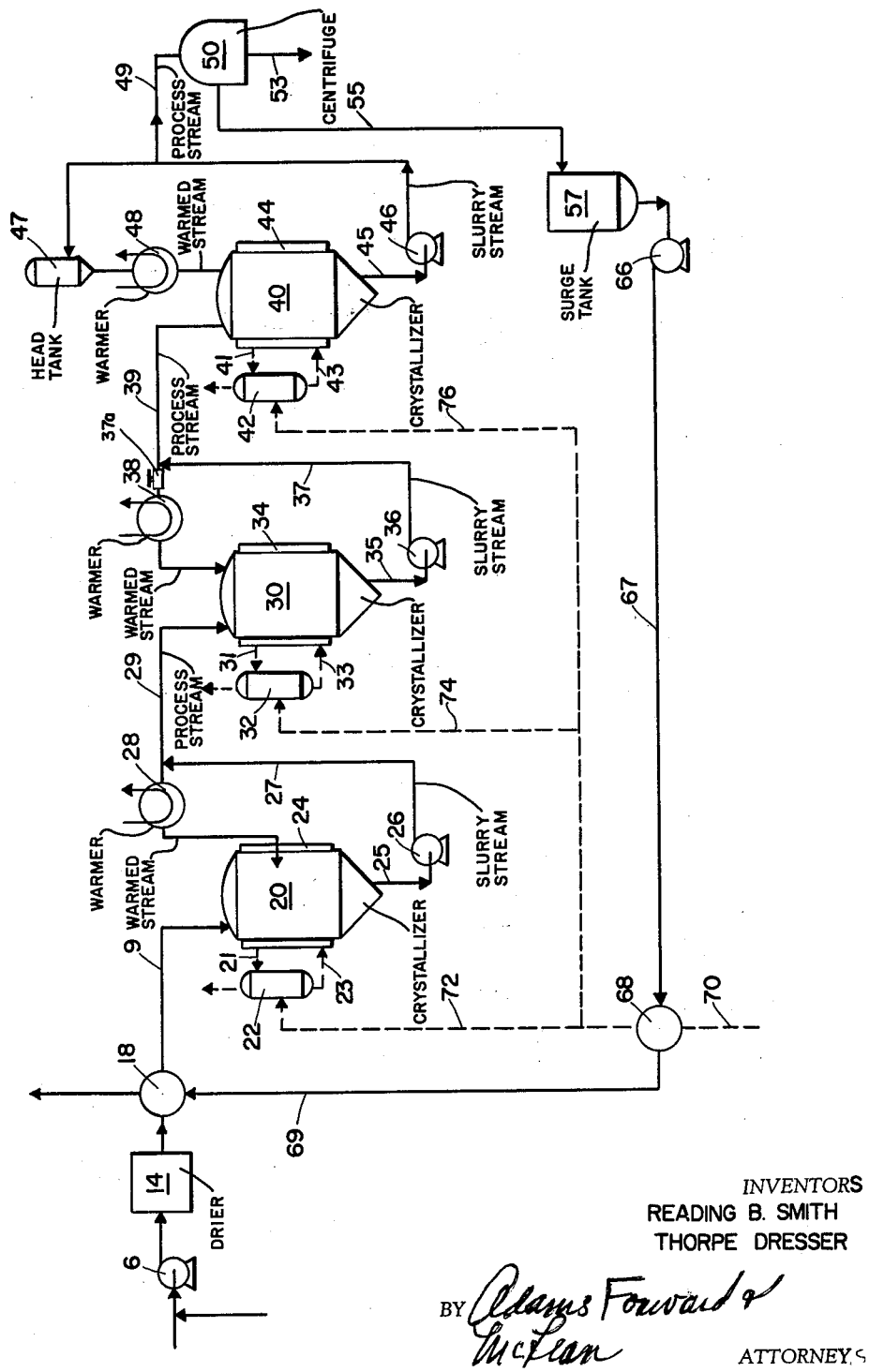
INVENTORS
READING B. SMITH
THORPE DRESSER
BY
ATTORNEYS

United States Patent Office 3,103,541
Patented Sept. 10, 1963

3,103,541
RECOVERY OF DURENE USING HEATED
SLURRY RECYCLE
Reading B. Smith, Flossmoor, and Thorpe Dresser, Markham, Ill., assignors, by mesne assignments, to Sinclair Research, Inc., New York, N.Y., a corporation of Delaware
Filed Nov. 12, 1959, Ser. No. 852,319
8 Claims. (Cl. 260—674)

This invention is a method for recovering durene from a hydrocarbon mixture containing durene and in particular gives attention to the formation of a durene crystal slurry of such consistency that filtration of durene from mother liquor is made considerably more quick and efficient. The process of this invention improves the filtration of the slurry by providing as a prefilt a slurry containing fewer finer crystals than is conventionally the case in durene separation processes. In the process of this invention fine durene crystals are eliminated by withdrawing chilled slurry from the crystallizer and effecting a small rise in its temperature before introduction back into the crystallizer. Further advantages can be afforded when desired by control of the temperature differential across the wall of the crystallizer.

Durene is generally produced in admixture with other hydrocarbons of similar boiling range by methods such as alkylating aromatics and reforming straight-run petroleum naphthas, etc. The latter method, after distillation of the product, frequently gives a hydrocarbon mixture containing a minor amount up to about 30% durene while the durene concentration in alkylate can be much greater. Such durene fractions produced by these and other methods contain a mixture of mostly aromatic hydrocarbons and may contain minor amounts of naphthenes and paraffins. The aromatics usually include the close-boiling durene isomers, isodurene and prehnitene, from which it is difficult to separate the durene. Since durene differs from its isomers more in its melting point than any other physical characteristics, it may be separated by freezing it out from its mixture.

In the recovery of durene from its associated hydrocarbons, the processing scheme generally employs a low-temperature crystallization which is preceded by a distillation to remove most of the lower and higher boiling hydrocarbons and which yields as a typical case, a mixture boiling primarily from about 350 to 405° F., preferably about 365 to 395° F. The concentration of durene in this mixture when obtained from naphtha reformate is generally in the range of about 10 to 20% by weight and when the mixture is chilled, the first crystals will form at a temperature from about −10 to +45° F. As this temperature is lowered, durene will crystallize from the mixture to fairly low temperatures, say about −80° F. However, as the temperature is lowered, the new crystals formed tend to become smaller and smaller, and the viscosity of the remaining liquid increases exponentially. Studies on durene crystals produced in low temperature studies show them to be relatively flat plates of an irregular hexagonal configuration. The diameter of the plates is generally in the region of about 10 to 50 microns, but frequently the crystals appear in agglomerates having 70–150 microns diameter.

In the filtration of a durene slurry the large durene crystals form a relatively open cake on the filter, which filter cake in turn filters out the small crystals, by catching them in the voids in the cake of larger crystals. To have a cake sufficiently open to allow passage of fluid the small crystal content of the slurry must not be so great that these voids become clogged. Such clogging, aggravated by increased liquid viscosity as well as by small crystal size, complicates filtering, and frequently dictates impractically long periods of time for the filtration to be performed, whether the filtration is done in a stationary filter, in a rotary filter under vacuum, or in a basket centrifuge. A proposed remedy for filtration problems is holding the supercooled crude durene mixture for a prolonged period to allow crystal growth. This prescription has been found unsatisfactory in that crystal growth has not been observed to take place to any noticeable extent in durene solutions.

In this invention the small crystal content of the prefilt slurry is reduced by a recycle step. Of the total slurry which leaves the crystallization or holding step, a major portion is passed through a heating or temperature raising step and returned to the crystallization zone. A lesser or process stream of slurry from the crystallizer, comprising in general less than about one-third of the crystallizer effluent is sent to the filter. The recycle and process streams may be taken from the crystallizer by separate lines or in one line and then divided. The ratio of recycle to process streams will ordinarily not be significantly larger than about 10 to 1 but larger recycles could be used although they are not now considered to be economically justified. Preferably the recycle stream to process stream ratio is about 3 to 6/1. It is emphasized that the recycle and process streams are essentially full range (as far as crystal particle size and liquids are concerned) portions of the crystallizer slurry. Accordingly, the process avoids any prefiltering or necessity for settling the slurry to obtain a fraction predominating in a desired crystal size.

The portion of slurry recycled is raised in temperature about 5 to 25° F., preferably about 8 to 15° F. above the temperature at which it left the cooling step. This warming is generally sufficient to melt about 5 to 15% of the solids recycled, and the solids which are melted are generally the small crystals which complicate filtering. Upon recrystallization the melted durene forms a further quantity of solid in a full range of crystal sizes, thus effectively increasing the concentration, in the slurry which eventually reaches the filtering stage, of the larger durene crystals at the expense of the small crystals. In the process of this invention durene is sometimes recovered as large gritty-feeling particles which are more or less spherical crystal agglomerates having a diameter of about 100–300 microns, which break up readily when dried.

In a process for durene recovery from a typical mixture with other hydrocarbons it is frequently advantageous to conduct the crystallization in a series of holding steps, each succeeding step removing a further measurable quantity of heat from the crystal slurry. Such a process is generally conducted in an apparatus which provides a series of cooling zones, each zone often, but not necessarily, being at a lower temperature than the preceding zone. The process of this invention can be applied to such a system, recycle stream being obtained, heated and returned with each stage of cooling and crystallization or only with selected stages. To obtain the greatest advantages from the system, recycling should be performed with the first stage of crystallization and with the last stage, that is, the stage which immediately precedes the filtration. In a process which uses only one cooling zone, the first and last cooling stages are identical and streams of recycle slurry from the first and last cooling stages comprise in reality one stream. Similarly, in such a system there is only one process stream from the combined initial and last crystallization stages and durene will be separated from this process stream. The recycling adds heat to the system, requiring transfer of the heat in the crystallizers and removal by the refrigeration cycle. If this recycling is initiated in an existing system, heat transfer or heat removal may dictate some reduction in flow rate but will result in greater overall production because of increased filtration rates.

The difficulties of the durene crystallization can also be minimized by control of the temperature differential between the hydrocarbon mixture and the refrigerant fluid across the wall of the crystallizer which separates the two. When this feature of the invention is to be employed the temperature differential across the wall is confined for the most part to about 10° F. or less to avoid undue formation of a hard crystal layer of durene on the wall which siginficantly hinders the rate of heat exchange across the wall.

The process of this invention may be more easily understood by reference to the accompanying drawing which shows in schematic form an apparatus suitable for the practice of the process of this invention.

In practicing this invention a durene-containing hydrocarbon mixture can be conducted by pump 6 and line 9 to a crystallizer 20. The mixture may be brought through the drier 14 and the heat exchanger 18 where it may be preliminarily cooled by indirect heat exchange with cool filtrate from a later stage of the durene separation process.

The temperature of the cooler 20 is regulated by a cool fluid from the refrigeration unit 22, which fluid passes through the lines 21 and 23 and the jacket 24. The temperature and velocity of this moving fluid are preferably regulated so that it is at a temperature of not more than about 10° F. below the temperature of the durene-containing hydrocarbon mixture in an immediately adjacent portion of the chiller 20, that is, the temperature difference across the crystallizer wall is not more than about 10° F. This cooled slurry, containing durene crystals of varying size, is conducted from the chiller 20 by line 25 to the pump 26 and thence through line 27 after which the stream of slurry is divided, if it is desired to conduct a recycle at this stage of crystallization.

The stream of the slurry which is not warmed is sent by line 29 to further treatment. The major portion may be sent to the warmer 28 where it is allowed to rise in temperature about 5 to 25° F. This temperature is generally sufficient to melt about 5 to 15% of the recycle stream, comprising mostly the smaller crystals, without affecting to a great extent the large crystals. This slightly warmed slurry is returned to chiller 20.

The slurry stream is conducted by line 29 to further treatment which may be immediate filtration but which preferably is another cooling stage, as represented by the chiller 30. This chiller has a refrigeration unit 32 and cool fluid supply line 33, heat exchanging jacket 34 and cool fluid exit line 31, and is also provided wtih slurry exit line 35, pump 36, and lines 37 and 39 leading to the next stage of processing. This chilling stage may also effect the described temperature control between the refrigerant and crystallizer slurry and be equipped with a recycle line which can lead the major portion of the slurry in line 37 back to the chiller 30 through valve 37a and the warmer 38. The line 39, as with the line 29, may lead directly to a filter or alternatively and preferably may lead to another chilling zone, as represented by the vessel 40. This chilling vessel may be operated similar to the other two and is once more provided with a refrigeration unit 42 which sends a cooled fluid through the line 43 to the jacket 44 of the chiller 40, which fluid, warmed slightly by indirect heat exchange with the slurry, is returned to the refrigeration unit through line 41. The slurry from the chiller leaves by means of line 45 and pump 46 and line 49 to the next stage of processing, which, after this third chilling step, is advantageously a filtration, performed for example in the centrifuge 50. Generally only a minor process stream is sent through line 49 to the filtration step while the major portion of the slurry is recycled. A head tank 47 may be interposed in the line to even the flow through warmer 48 back to chiller 40, by reason of the intermittent flow requirements of centrifuge 50. After the filtration step the cake comprising durene crystals and usually containing entrained impurities, is removed to further processing by the line 53.

This further processing has for its object the production of durene of a purity sufficient for its ultimate use. A preferred refining procedure involves a series of liquid-solid separation steps along with reslurrying of the filter cakes produced. Usually the temperature of the slurry which leaves the crystallizer 40 will be allowed to rise somewhat but preferably the durene crystals do not rise in temperature more than about 40° F. between the exit from the crystallizer and recovery of the filter cake. The filter cake from this first filtration may be more easily handled when it is slurried with toluene or other benzene aromatic hydrocarbon, for instance, containing up to about 8 carbon atoms, which is liquid at the temperature of the filter cake. The refiltration may be performed on the slurry with or without an intermediate additional chilling stage.

The net result of such a processing scheme will be to produce a durene filter cake still having entrained impurity, but this time the major impurity is an aromatic solvent easily separated from the durene by distillation, where in the first cake the impurities were close-boiling to durene. A number of refining steps may be included in the further processing and may be performed, as may seem advantageous to give a durene product of more than about 90%, preferably at least about 95% purity.

The filtrate from the first filtration is removed from processing through the line 55. Filtrate from further refining steps is separated, e.g., by distillation of the aromatic solvent used to disentrain it from the filter cake, and may be returned to feed tank 14 for reprocessing. The coolness of the filtrate may be used with advantage to reduce refrigeration costs in the system. This may be done by conducting the cool filtrate by means of surge tank 57, pump 66 and line 67 to a heat exchanger 68 where the filtrate may be used to cool the refrigerant fluid, and through the line 69 to the heat exchanger 18 where the filtrate may be used to reduce the temperature of the hydrocarbon mixture fed to the durene recovery system.

The refrigerant fluid, preferably in liquid form, enters the cooling system by line 70 and is cooled in heat exchanger 68. The refrigerant fluid is distributed through lines 72, 74 and 76 to the refrigeration units 22, 32 and 42. In the refrigeration unit the refrigerant fluid is vaporized, absorbing heat from the cool fluid flowing in the jackets 24, 34, and 44. The fluid may be any fluid which changes from liquid to vapor phase at a sufficiently low temperature. Propylene is generally easily available and can cool the crystallizers to as low as about −30° F. Where a −40° F. temperature is desired, ethane may be used as the refrigerant, or if this is considered to be too expensive, a mixture of 75 mole percent ethylene and 25 mole percent propylene, or other petroleum refinery mixed stream of desired characteristics could be substituted.

The warmers 28, 38 and 48 may merely be heat exchangers wherein the slurry is exposed to any sufficiently warm fluid which may be, for example, a glycol-water mixture or even air at ambient temperature, for a period of time sufficient to allow the prescribed temperature rise.

The temperature range for durene crystallization from hydrocarbon mixtures as described above is generally about −80° F. to 30° F., and preferably the final crystallization temperature is about −50 to −20° F. In an embodiment of the process of this invention where a series of chilling zones for example, three chilling zones, is used, the temperature can be reduced generally 10 to 30° F. in each succeeding zone. An example, when three chilling zones are used the temperature in the first zone can be generally from about 0 to 30° F., in the second chilling zone from about −20 to 10° F. and in the third zone advantageously from about −40 to −20° F. If rewarming is confined to the crystallizer effluent immediately preceding the filtration zone a temperature pattern wherein the last two chilling zones produce the same effluent temperature may be advantageous. Such a temperature pattern can be, for example, −20° F., −30° F. and −30° F.

for each of the three crystallization zones respectively, or −30° F., −40° F., −40° F.

In a specific example of the process of this invention, which is not to be taken as limiting, a three-chilling zone process was established. A hydrocarbon mixture boiling at 370 to 395° F. and containing about 11.5% durene, along with isodurene and other close-boiling hydrocarbons was obtained as the heart-cut of a heavy fraction of petroleum naphtha reformate and was used as the feed for the process. 11.93 barrels/hr. of this feed entered the top of the first chilling zone at about 75° F. where it encountered the main bulk of crystallizer contents—a dilute slurry at 10° F. The refrigerant in the jacket is maintained preferably about 10° F. lower than the crystallizer contents.

The pump in the exit line from the chilling zone pumped about 51.93 barrels/hr. of slurry from the bottom part of this chilling zone, sending 40.0 barrels/hr. of slurry back to the same chilling zone through the warmer, and sending about 11.93 barrels/hr. (about 23% of the quantity of slurry leaving the chiller) on to the next stage at a temperature of about 10° F. The recycled slurry was heated by indirect exposure to 140° glycol-water mixture to 12° F. and its solids content reduced 12% before return to first chilling zone. In this second chiller the feed is introduced into the crystallizer contents which are at −10° F. The refrigerant is maintained 10° F. lower than the crystallizer contents.

About 78.63 barrels/hr. was removed by the pump from the bottom of the second chiller, about 15% of this (11.93 bbl./hr.) being sent at −10° F. to a third chilling zone. The recycled slurry (about 66.7 bbl./hr., 85% of the crystallizer effluent) was heated by indirect exposure to a 140° F. glycol-water mixture to a temperature of −1° F. and its solids content was reduced about 9.8% before being returned to the second chilling zone. In the third chilling zone the slurry from the second chiller, which entered at a temperature of −10° F. joined the crystallizer contents at −27° F. while maintaining a temperature differential across the wall of the crystallizer less than 10° F. 35.83 barrels/hr. of slurry were removed at this temperature from the bottom of the third chiller and 23.9 barrels/hr. of this were recycled after being reduced about 13.4% in solids content by being warmed to about −11° F. 11.93 barrels/hr. (about 33%) of the slurry were sent to the centrifuge which separated out a cake containing 85–90% durene from 10.35 barrels/hr. of filtrate. The filtrate was conducted in an indirect heat exchange relationship with the propylene refrigerant fluid used in the refrigeration units, then in indirect heat exchange with durene-rich feed to the first crystallizer. The cake is removed from the centrifuge at about −20° F. into a melt tank and melted by heating and by the addition of about twice its weight of toluene. This melt is sent to a further crystallization zone where it is brought to a temperature of about +18° F., and then to a second centrifuge for filtration at +20° F.

Table I below gives a comparison of results obtained in a complete durene separation procedure when prior to several filtration and purification steps, the treatment described in the example given above was used, with results obtained without slurry recycle and warming. In both cases the cake from the first centrifuge was reslurried in toluene and again filtered.

*Table I*

|  | Without Recycle | With Recycle |
| --- | --- | --- |
| Percent Durene in filtrate | 5.6–6.5 | 5.0–5.8 |
| Average Feed rate (bbl./day) | 170 | 265 |
| Durene Product (bbl./day) | 7.8 | 14.5 |
| Bbl. product/100 bbl. feed | 4.6 | 5.5 |

It is thus seen that recycling and warming of the major portion of the durene slurry produced in low temperature crystallization can increase plant capacity for feed by more than 50% and come near to doubling the amount of durene recovered in a given time period.

We claim:

1. In a continuous method for separating durene from its mixture with aromatic hydrocarbons including durene isomers, the mixture boiling primarily in the range of about 350° F. to 405° F., which method comprises cooling the durene-containing mixture to crystallize durene, withdrawing resulting slurry from a stage of crystallization immediately prior to separating durene to provide a minor portion of withdrawn slurry as a process stream and a major portion of the withdrawn slurry as a recycle stream, warming said recycle stream to about 5 to 25° F. above its crystallization zone exit temperature, recycling said warmed stream to its zone of crystallization and separating durene crystals from said process stream.

2. The method of claim 1 in which the weight ratio of recycle stream to process stream is about 3 to 6:1.

3. The method of claim 1 in which the separated durene crystals are slurried in an aromatic hydrocarbon of up to about 8 carbon atoms.

4. The method of claim 3 in which the aromatic hydrocarbon is toluene.

5. In a continuous method for separating durene from its mixture with aromatic hydrocarbons including durene isomers, the mixture boiling primarily in the range of about 350° F. to 405° F., which method comprises cooling the durene-containing mixture in a plurality of stages to crystallize durene in each stage, withdrawing resulting slurry from each stage of crystallization, separating the slurry stream withdrawn from at least the first and last stages into a process stream comprised of a minor portion of withdrawn slurry and into a recycle stream comprised of a major portion of withdrawn slurry, separating durene crystals from the process stream withdrawn from the last of the plurality of stages and sending remaining process streams directly to their next succeeding crystallization zones; warming each of said recycle streams to about 5 to 25° F. above its respective crystallization zone exit temperature, recycling each of said warmed streams to its respective zone of crystallization and conducting any withdrawn slurry stream not separated directly to the next succeeding crystallization zone.

6. The method of claim 5 in which the recrystallization temperature in the last stage is about −50 to −20° F. and the warming raises the temperature of each recycle stream about 8 to 15° F.

7. The method of claim 1 in which cooling is performed by indirect heat exchange with a refrigerant wherein the temperature differential between the refrigerant and the slurry in the crystallizer is not greater than about 10° F.

8. The method of claim 5 in which cooling is performed by indirect heat exchange with a refrigerant wherein the temperature differential between the refrigerant and the slurry is not greater than about 10° F.

References Cited in the file of this patent

UNITED STATES PATENTS

| | | |
|---|---|---|
| 2,756,261 | Fetterly | July 24, 1956 |
| 2,766,310 | Bennett et al. | Oct. 9, 1956 |
| 2,776,328 | Bennett et al. | Jan. 1, 1957 |
| 2,801,272 | Bown et al. | July 30, 1957 |
| 2,848,515 | Pfennig | Aug. 19, 1961 |